US008757556B2

(12) United States Patent
Rist et al.

(10) Patent No.: US 8,757,556 B2
(45) Date of Patent: Jun. 24, 2014

(54) AERODYNAMIC BODY, REGULATING FLAP OR MAIN WING OR FIN OF AN AIRCRAFT AS WELL AS A STRUCTURAL COMPONENT WITH SUCH AN AERODYNAMIC BODY

(75) Inventors: Ulrich Rist, Stuttgart (DE); Andreas Knoll, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/410,365

(22) Filed: Mar. 2, 2012

(65) Prior Publication Data
US 2012/0223190 A1    Sep. 6, 2012

Related U.S. Application Data (63) Continuation of application No. PCT/EP2010/005390, filed on Sep. 2, 2010.
(60) Provisional application No. 61/239,221, filed on Sep. 2, 2009.

(30) Foreign Application Priority Data

Sep. 2, 2009  (DE) .................. 10 2009 039 769

(51) Int. Cl.
*B64C 21/04* (2006.01)
*B64C 21/06* (2006.01)
(52) U.S. Cl.
USPC ........................................ 244/208; 244/204.1
(58) Field of Classification Search
USPC ........... 244/208, 207, 209, 204.1, 201, 200.1, 244/204
See application file for complete search history.

(56) References Cited

U.S. PATENT DOCUMENTS

| 3,467,348 | A  |   | 9/1969  | Lemelson |
| 5,255,881 | A  | * | 10/1993 | Rao ............................. 244/199.1 |
| 5,894,990 | A  |   | 4/1999  | Glezer et al. |
| 6,457,654 | B1 | * | 10/2002 | Glezer et al. ....................... 239/4 |

(Continued)

FOREIGN PATENT DOCUMENTS

GB          1 332 026          10/1973

OTHER PUBLICATIONS

International Search Report for Application Serial No. WO 2011/026622 A3 dated Mar. 2, 2011.

(Continued)

*Primary Examiner* — Philip J Bonzell
(74) *Attorney, Agent, or Firm* — Jenkins, Wilson, Taylor & Hunt, P.A.

(57) ABSTRACT

An aerodynamic body with an aerodynamic body surface that creates a contoured surface for a fluid to stream around, with a device to influence the flow of the fluid streaming around the aerodynamic surface. The flow-influencing device includes a passage to link the fluid streaming around the aerodynamic surface with an actuator space of an aspirating and purging device situated in the aerodynamic body, and an indentation that is situated next to the passage, which is formed by a recessed section of the aerodynamic surface on a flow-influencing region within the contoured surface of the aerodynamic surface, so that a boundary wall is configured as part of the recessed surface lying opposite the indentation. The aspirating and purging device can generate a swirl in the flow of the fluid streaming around the aerodynamic surface, the rotational axis of which is directed along the assumed aerodynamic body chord direction.

12 Claims, 3 Drawing Sheets

(56) References Cited

U.S. PATENT DOCUMENTS

| | | |
|---|---|---|
| 6,866,234 B1 * | 3/2005 | Hassan et al. ............... 244/208 |
| 7,635,107 B2 * | 12/2009 | Shmilovich et al. ......... 244/207 |
| 8,136,767 B2 * | 3/2012 | Cueman et al. ............. 244/208 |
| 2005/0040293 A1 * | 2/2005 | Hassan et al. ............... 244/208 |
| 2006/0273197 A1 | 12/2006 | Saddoughi et al. |
| 2009/0008505 A1 * | 1/2009 | Meister ....................... 244/204 |

OTHER PUBLICATIONS

International Preliminary Report on Patentability and Written Opinion for Application Serial No. PCT/EP2010/005390 dated Mar. 27, 2012.

* cited by examiner

AERODYNAMIC BODY, REGULATING FLAP OR MAIN WING OR FIN OF AN AIRCRAFT AS WELL AS A STRUCTURAL COMPONENT WITH SUCH AN AERODYNAMIC BODY

CROSS-REFERENCE TO RELATED APPLICATIONS

The present application is a continuation of International Application No. PCT/EP2010/005390, filed on Sep. 2, 2010, which claims priority from German Application DE 10 2009 039 769.8, filed on Sep. 2, 2009, and claims the benefit of U.S. Provisional application 61/239,221, filed on Sep. 2, 2009, each of which is hereby incorporated in its entirety by reference.

FIELD OF THE INVENTION

The invention relates to an aerodynamic body, a regulating flap or a main wing or a fin of an aircraft, as well as to a structural component with such an aerodynamic body.

BACKGROUND

Known from prior art are aerodynamic bodies, in particular as aircraft tail assemblies or aircraft wings, the surface of which is provided with vortex generators. These vortex generators are small plates inclined relative to a direction of incident flow, which are arranged on the upper side of a wing or the rear fuselage of the aircraft.

However, the disadvantage to such vortex generators is that the vortices are permanently generated independently of flight status, even when the latter are not at all needed. This results in an unnecessary drag, which is accompanied by elevated fuel consumption.

Also known are vortex generators in which compressed air is routed from a reservoir to openings in the surface of the aerodynamic body by way of lines. When vortices are needed, valves are actuated in such a way that compressed air can exit the openings into the primary flow streaming around the aerodynamic body. While compressed air streams out, the primary flow is here overlapped by the second flow, thereby yielding vortices.

However, these vortex generating devices necessitate that additional structural components be integrated into the aerodynamic body, which increases the overall weight, and hence also manifests itself in an elevated fuel consumption. High fuel consumption is undesirable in contemporary aircraft construction, since aside from placing an increased burden on the environment, they reduce the cruising range or payload of the aircraft.

SUMMARY

Various embodiments of the invention provide an aerodynamic body with which the flow around the latter can be specifically and efficiently influenced in such a way as to lessen the arising separation effects of the flow on the aerodynamic body.

Various embodiments of the invention further provide a regulating flap or a main wing or a fin of an aircraft as well as a structural component with such an aerodynamic body.

According to various embodiments of the invention, an aerodynamic body is provided with an aerodynamic body surface that creates an aerodynamic contoured surface for fluid to stream around. In particular, the aerodynamic body surface can extend between a leading edge and a trailing edge spaced apart from the latter in the chord direction of the aerodynamic body. The aerodynamic body further exhibits at least one flow-influencing device to influence the flow of the fluid streaming around the aerodynamic surface. The respective flow-influencing device exhibits:

- A passage running along the thickness direction of the aerodynamic body to link the fluid streaming around the aerodynamic surface with an actuator space of an aspirating and purging device situated in the aerodynamic body (1),
- An indentation in the aerodynamic surface, in particular one shaped like a trough, that is situated next to the passage viewed in the aerodynamic body chord direction and extends along the aerodynamic body wingspan direction, which is formed by a recessed section of the aerodynamic surface on a flow-influencing region within the flat extension of the aerodynamic contoured surface of the aerodynamic surface, so that a boundary wall is configured as part of the recessed surface lying opposite the indentation as viewed in the aerodynamic body wingspan direction and in relation to the passage.

In particular, the boundary wall can be configured as an elongated wall region of the passage.

The aspirating and purging device is designed in such a way as to periodically cause fluid to be alternately aspirated and purged through the passage, allowing it to generate a swirl in the flow of the fluid streaming around the aerodynamic surface, the rotational axis of which is directed along the aerodynamic body chord direction, the assumed primary direction of flow.

This swirl imparts energy to the fluid streaming around the aerodynamic body, which in conjunction with the swirl can lead to a situation where the flow exhibits a more stable boundary layer behind the respective arrangement comprised of a respective passage and indentation as viewed in the direction of flow. In particular, this makes it possible, in flow states where there exists a tendency toward flow separation at specific locations on the aerodynamic surface due to a pressure rise in the direction of flow, to prevent flow separation or shift it into a rear area of the aerodynamic surface by situating at least one arrangement comprised of a respective passage and indentation in this area of the aerodynamic surface.

This provides an especially simple way of delaying instances of flow separation, wherein the noise generated by the disruption of large, coherent vortex structures is also reduced.

In the aspiration phase, the fluid emanating from the flow around the aerodynamic surface is diverted into the indentation, and deflected into the passage by the boundary wall. The secondary flow emanating from the aerodynamic contoured surface on the side lying on the boundary wall can here break up above the indentation or be carried away toward the outside. Over the course of several aspiration and purging phase cycles, the flows combine to form an asymmetrical flow state viewed in the chord direction or primary flow direction, and hence a swirl above the indentation, which is stable due to the cyclic sequence.

Based on an example embodiment of the aerodynamic body according to the invention, the latter can exhibit an edge line in the area of transition between the boundary wall and aerodynamic contour surface. The edge line here acts as a tear-off edge, making it possible to advantageously support the presence of the asymmetrical flow state as viewed in the chord direction or primary flow direction by correspondingly designing the edge region or corner region. The contour lines of the respectively adjacent boundary wall and aerodynamic contour surface viewed in the aerodynamic body chord direction can here converge toward each other in the area of the edge line at an angle of 90 degrees or less than 90 degrees, i.e., at an acute angle. The edge line can here be designed as a corner or with a relatively low radius for the contour line at this location.

In an example embodiment of the aerodynamic body according to the invention, the recessed section of the aerodynamic surface can exhibit a surface section that runs at an angle to the aerodynamic contoured surface lying next to the indentation as viewed in the aerodynamic body wingspan direction, so that the surface section slopes downward toward the mouth of the passage, away from the aerodynamic contoured surface as viewed from the latter, i.e., in the aerodynamic body chord direction and aerodynamic body wingspan direction.

Based on another example embodiment of the aerodynamic body according to the invention, its aerodynamic body surface can exhibit a plurality of arrangements comprised of a respective passage and indentation, wherein an exchange of flows takes place between at least several of these arrangements and an actuator space of an aspirating and purging device.

In another example embodiment of the aerodynamic body according to the invention, the arrangements comprised of a respective passage and indentation can be situated consecutively and spaced apart from each other as viewed in the aerodynamic body chord direction, wherein the combinations of an indentation and passage share the identical orientation as viewed in the aerodynamic body wingspan direction.

In the aerodynamic body according to various embodiments the invention, the arrangements comprised of a respective passage and indentation can alternatively or additionally be situated adjacent to each other and spaced apart from each other as viewed in the aerodynamic body wingspan direction, wherein the combinations of an indentation and passage are each alternately oriented oppositely relative to each other as viewed in the aerodynamic body chord direction.

The aspirating and purging device can consist of a membrane actuator that at least partially borders the actuator space of the latter, and is configured in such a way that the volume of the actuator space can be increased and decreased by correspondingly activating the membrane actuator, wherein decreasing the actuator space volume purges fluid through the passage, and increasing the actuator space volume aspirates fluid through the passage. In particular, the membrane actuator can here be electrically actuated, and designed as a loudspeaker or piezo-actuator. The latter can exhibit a boundary shell with an opening area covered by a membrane, wherein the membrane can be actuated in such a way as to move it toward the inside relative to the interior actuator space bordered by the boundary shell and membrane to reduce its volume, and toward the outside to increase its volume.

As an alternative to the above, the aspirating and purging device can exhibit a flow-generating device that operatively interacts with the actuator space of the aspirating and purging device in such a way that fluid is alternately purged through the passage and aspirated through the passage periodically when the flow-generating device is correspondingly activated. The flow-generating device can here exhibit a rotary piston pump and/or an intermittently operating piston pump, or consist of the latter.

Another aspect of embodiments of the invention provides a regulating flap or main wing or fin of an aircraft that is configured like an aerodynamic body based on an embodiment according to the invention. It can here be provided that a plurality of arrangements comprised of a respective passage and indentation be situated in the rear half of the aerodynamic surface as viewed in the aerodynamic body chord direction.

In another aspect of embodiments of the invention, a structural component for an aircraft, land vehicle or watercraft is provided with a structural component designed as an aerodynamic body, which is configured like an aerodynamic body based on an embodiment according to the invention.

BRIEF DESCRIPTION OF THE DRAWINGS

In the following, example embodiments of the invention will be described by making reference to the appended figures, wherein.

DESCRIPTION

The aerodynamic body 1 according to an embodiment of the invention exhibits an aerodynamic body surface 2 that forms an aerodynamic contoured surface 3 provided for a fluid to stream around. In terms of various embodiments of the invention, an aerodynamic body is understood as a body around which a fluid streams, e.g., gas or liquid, which derives its primary function from having a fluid stream around it. For example, the aerodynamic body can be a main wing, a regulating flap, a fin, i.e., a horizontal stabilizer or vertical stabilizer, an auxiliary wing, such as a slat or canard or even a fuselage. In another example, the aerodynamic body can be a structural part of a land vehicle, e.g., a spoiler. For example, the aerodynamic body can be part of a hull or rudder of a ship. In general, the problem with such aerodynamic bodies is an undesirable tendency toward flow separation, depending on how and where they are used. An aerodynamic body according to various embodiments of the invention makes it possible to efficiently influence the flow in such a way as to stabilize the flow around the aerodynamic body and/or reduce the tendency toward flow separation, either locally or over a wide area of the aerodynamic body.

The aerodynamic contoured surface is understood as the area of the aerodynamic body surface 2 that performs the intended primary function when a fluid streams around it, specifically to generate lift in the case of a wing.

Figure 1:
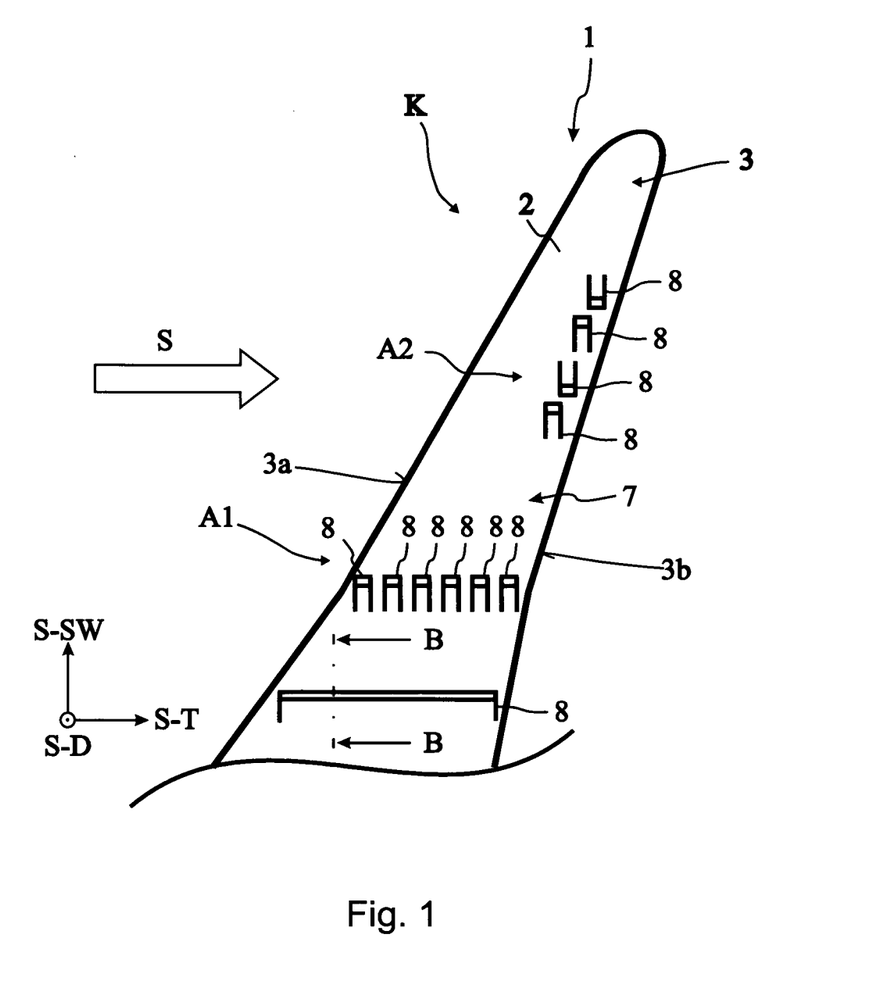
FIG. 1 is a top view of an aerodynamic body according to an embodiment of the invention in the form of an airfoil of an aircraft, which exhibits a plurality of vortex generators according to an embodiment of the invention with a respective example embodiment of an arrangement comprised of a respective passage and indentation.

FIG. 1 presents a top view of an aerodynamic body 1 in the form of an airfoil of an aircraft. For purposes of orientation and further description, a coordinate system relating to the aerodynamic body is plotted on the figures, showing an aerodynamic body wingspan direction S-SW, aerodynamic body chord direction T-SW and aerodynamic body thickness direction S-D.

The aerodynamic body 1 exhibits an aerodynamic body surface 2 that extends between a leading edge 3a and a trailing edge 3b spaced apart from the latter in the aerodynamic body chord direction S-T in the depicted example embodiment, and forms an aerodynamic contoured surface 3 provided for a fluid to stream around. Furthermore, the aerodynamic body 1 exhibits at least one flow-influencing device 7 to influence the flow of the fluid streaming around the aerodynamic surface 2. The flow-influencing device 7 is made up of an arrangement 8 comprised of a respective passage 10 and indentation 20. In addition, the flow-influencing device 7 has allocated to it an aspirating and purging device (not shown on the figures), or the flow-influencing device 7 exhibits an aspirating and purging device.

A fluid, in this case air, is made to stream around the aircraft wing in a primary direction of flow S, wherein the primary direction of flow S of the air streaming toward the aerodynamic body runs along the wing chord direction, meaning generally along the aerodynamic body chord direction S-T. The primary direction of flow S can generally also run at an angle relative to the aerodynamic body chord direction S-T.

The fluid that streams around the aerodynamic body is water in one application of the aerodynamic body according to an embodiment of the invention, e.g., aboard hulls. The solution according to an embodiment of the invention can similarly be readily used for this application.

FIG. 1 depicts several arrangements 8 comprised of a respective passage 10 and indentation 20, which are situated on the surface of the wing 1. A sequence A1 of six arrangements 8 comprised of a respective passage 10 and indentation situated consecutively in the aerodynamic body chord direction S-T is shown as an example on FIG. 1 in a region of the aerodynamic surface 2 of the aerodynamic body 1 or the wing. Such a sequence A1 of arrangements 8 in the aerodynamic body chord direction S-T makes it possible to influence the flow according to various embodiments of the invention over a wider area extending in the aerodynamic body chord direction S-T. Depicted in the inner region of the wing 1 shown on FIG. 1 is a single arrangement 8 comprised of a respective passage 10 and indentation 20, which extends lengthwise over most of the upper side of the aerodynamic surface 2. This embodiment of an arrangement 8 also makes it possible to influence the flow according to an embodiment of the invention over a larger area extending in the aerodynamic body chord direction S-T. A series A2 of arrangements 8 situated consecutively and also staggered relative to each other as viewed in the aerodynamic body wingspan direction S-SW—see the outer region of the wing 1 shown on FIG. 1—can also be used to influence the flow according to an embodiment of the invention over a larger region extending in the aerodynamic body wingspan direction S-SW.

The arrangements 8 comprised of a respective passage 10 and indentation 20 can be situated consecutively and spaced apart from each other in the aerodynamic body chord direction S-T (sequence A1), wherein the combinations of a respective indentation 20 and passage 10 are identically oriented as viewed in the aerodynamic body chord direction S-T, i.e., the indentations 20 of sequence A1 lie on the same side of the arrangement comprised of the indentation and passage as viewed in the chord direction S-T.

It can alternatively or additionally be provided on the aerodynamic body K that the at least two arrangements 8 are situated adjacent to each other and spaced apart from each other as viewed in the aerodynamic body wingspan direction S-SW, wherein a respective two adjacent arrangements each comprised of a combination of an indentation 20 and passage 10 are oriented oppositely relative to each other as viewed in the aerodynamic body chord direction S-SW, meaning that the indentations lie on opposite sides from each other as viewed in the wingspan direction S-SW, as illustrated by the arrangement A2 shown on FIG. 1. In this constellation of mutually opposing arrangements of a respective indentation 20 and passage 10, vortices that rotate in an opposite rotational direction arise on respectively adjacent arrangements 8. These respectively adjacent vortices become intertwined, in a manner of speaking, one facilitating the other. This allows them to stabilize and thus remain intact for longer than they would in a constellation where these vortices would not influence each other. Such a series A2 of mutually oppositely situated arrangements comprised of an indentation 20 and passage 10 can hence be provided at locations of the aerodynamic body K that provide for vortices that remain stably intact for as long as possible.

As an alternative to the above, it can be provided for the aerodynamic body K that the at least two arrangements 8 are situated adjacent to each other and spaced apart from each other in the aerodynamic body wingspan direction S-SW, wherein the combination of an indentation 20 and passage 10 are identically oriented as viewed in the aerodynamic body chord direction S-SW, wherein the indentations lie on the same side of the arrangement comprised of the indentation and passage as viewed in the wingspan direction S-SW. In this constellation of concordantly situated arrangements comprised of a respective indentation 20 and passage 10, frictional losses arise in the adjacent, mutually influencing, and co-rotating vortices, so that these vortices are less stable over time, and break up more quickly than in the example embodiment described above. As a consequence, such a series of concordantly situated arrangements comprised of an indentation 20 and passage 10 can be provided at locations of the aerodynamic body K where vortices are intended to form on the surface of the latter for only a relatively short period, i.e., break up relatively quickly since they influence each other while rotating in the same direction. In particular, this plurality of arrangements 8 situated concordantly to each other can also be used to fight noise, and in this instance be advantageously placed at locations of the aerodynamic body where noise is generated by the flow that locally arises there.

Figure 2:
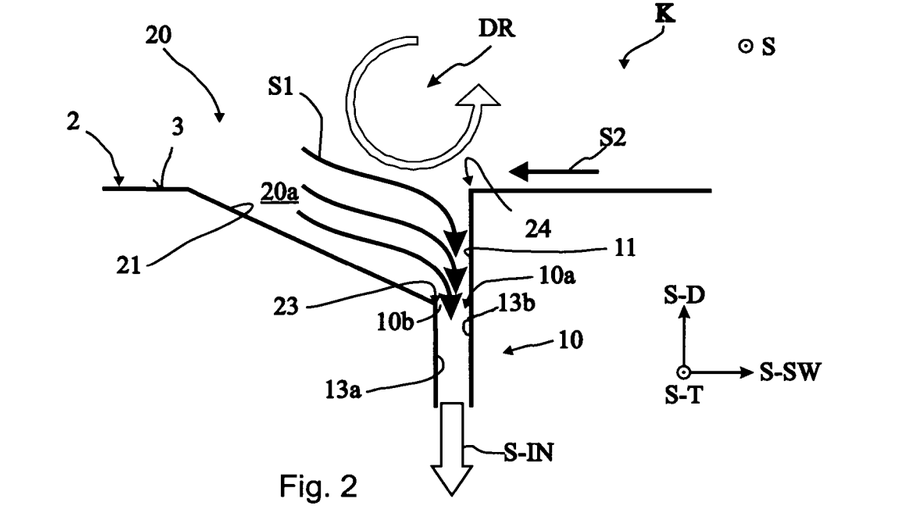
FIG. 2 is a partial sectional view of an example embodiment according to the invention of a provided arrangement comprised of a respective passage and indentation along intersecting line B-B from FIG. 1 in an aspiration phase, during which air streams from the region of the aerodynamic surface into the passage.
Figure 3:
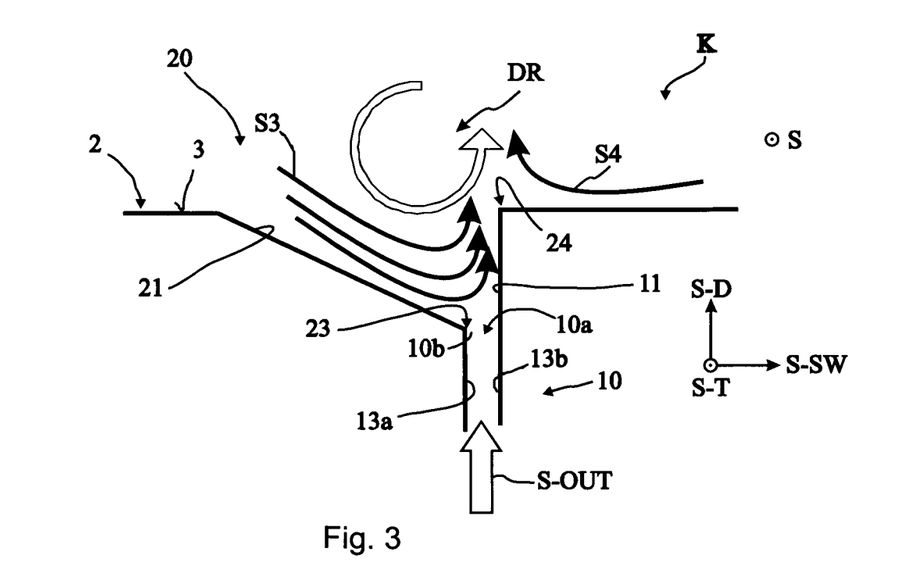
FIG. 3 is a partial sectional view of the example embodiment of the arrangement comprised of a respective passage and indentation according to FIG. 2 in a purging phase, during which air streams out of the passage into the region of the aerodynamic surface, FIG. 4 to go along with the embodiment depicted on FIGS. 2 and 3 is a partial sectional view of another example embodiment of the arrangement provided according to the invention comprised of a respective passage and indentation, in a state where fluid is streaming into the passage from the region of the aerodynamic surface.

Shown on FIGS. 2 and 3 as part of the flow-influencing device 7 provided according to an embodiment of the invention to influence the flow of the fluid streaming around the aerodynamic surface 2 is an example embodiment of an arrangement 8 according to an embodiment of the invention comprised of a respective passage 10 and indentation 20, which is formed next to the passage in the aerodynamic body wingspan direction S-SW. An actuator space or an interior space of an aspirating and purging device is fluidically coupled to the passage 10, so that the aspirating and purging device can influence the flow state in the indentation 20 and in the area above the latter. The passage 10 runs along the aerodynamic body thickness direction S-D, meaning into the aerodynamic body 1 as viewed from the indentation 20.

The indentation 20 extends along the aerodynamic body wingspan direction S-SW, and is formed by a recessed section 21 in the aerodynamic surface 2 on a flow-influencing region within the aerodynamic contoured surface 3 of the aerodynamic surface 2. As a consequence, the aerodynamic contoured surface 3 lies around the recessed section 21. The essentially trough-shaped indentation 20 is hence situated next to the passage 10 viewed in the aerodynamic body chord direction S-T, or in back or front of the passage 10 viewed in the aerodynamic body wingspan direction S-SW.

The indentation 20 is formed by a recessed section 21, which viewed in the aerodynamic body wingspan direction S-SW runs at an angle to the aerodynamic contoured surface 3 lying next to the indentation 20 in the embodiment according to FIGS. 2 and 3, so that the surface section 21 slopes downward toward the mouth 10a of the passage 10, away from the aerodynamic contoured surface 2a as viewed from the latter. In the embodiment according to FIGS. 4 and 5, in which parts having the same function are labeled with the same reference numbers as in the depiction on FIGS. 2 and 3, the indentation 20 is formed by a recessed section 21, which exhibits a lateral wall 21a and a floor region 21b. The lateral wall 21a is shaped like a stepped flank as viewed in the aerodynamic body chord direction S-T, since the contour line of the lateral wall 21a runs at a relatively large angle, e.g., ranging between 50 degrees and 90 degrees, relative to the contour line of the aerodynamic contoured surface 3.

Figure 4:
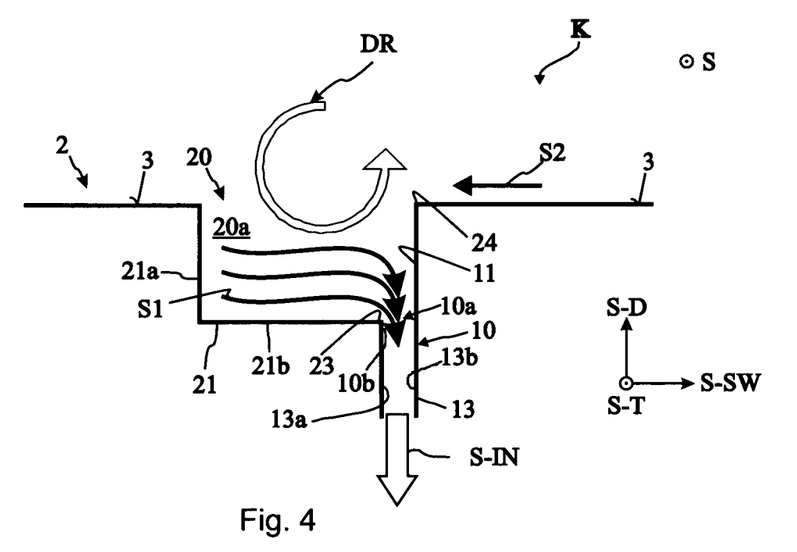
Figure 5:
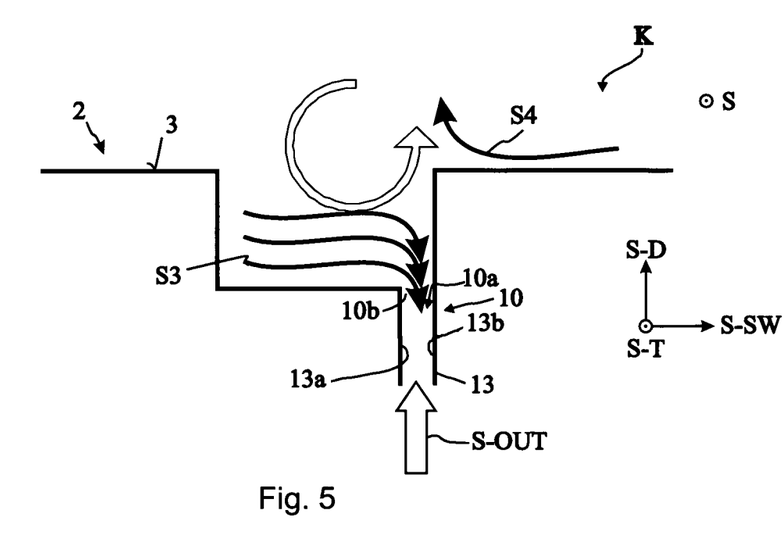
FIG. 5 is the embodiment of the arrangement comprised of a respective passage and indentation depicted on FIG. 4 in a state where fluid is streaming out of the passage into the region of the aerodynamic surface.

The passage 10 is situated to the side of the floor region 21b. A boundary wall 11 is formed in relation to the position of the passage 10, and its contour line that arises as viewed in the aerodynamic body chord direction S-T runs at a relatively large angle overall, e.g., ranging between 50 degrees and 90 degrees, relative to the contour line of the aerodynamic contoured surface 3. The boundary wall 11 extends from the mouth 10a to the edge region 24.

Therefore, the mouth 10a of the passage 10 lies next to the floor region 21b, forming an opening 10b in the indentation 20. The contour line of the indentation 20 that arises viewed in the aerodynamic body chord direction S-T exhibits a first edge region 23 lying at the location of the mouth 10a, forming the transition from the floor region 21b to the passage 10. Similarly, the contour line of the indentation 20 that arises viewed in the aerodynamic body chord direction S-T exhibits a second edge region 24, which forms the transition from the boundary wall 11 to the aerodynamic contoured surface 3 that is interrupted by the indentation in terms of the flow streaming around the aerodynamic contoured surface 3. The first edge region 23 is situated below as viewed in the aerodynamic body wingspan direction S-SW, i.e., more toward the interior of the aerodynamic body 1 in relation to the position of the aerodynamic contoured surface 3 than the second edge region 24, so that the boundary wall 11 extends between the mouth 10a and aerodynamic contoured surface 3, thereby forming a lateral wall, specifically the lateral wall of the indentation 20 situated at the mouth 10. As a consequence, the boundary wall 11 can also be configured in particular as an elongated wall region of the passage 10. In particular, the second edge region 24 or area of transition between the boundary wall 11 and aerodynamic contoured surface 3 can be designed with a contour line having a relatively low bending radius, or even as a corner, meaning exhibit an edge line (FIGS. 2, 3, and 4, 5). In an aerodynamic body configured as a flap or wing, the bending radius can in particular measure less than 10 mm.

The contour line of the boundary wall 11 can trace a straight line, either sectionally or in its entirety, as shown on FIGS. 2 and 3 as well as 4 and 5. The contour line of the boundary wall 11 can also follow a curved progression, and in so doing, for example, move away from indentation 20 starting at the location of the opening 10b, i.e., toward the outside.

It is equally possible for the boundary wall 11 to be curved in the direction of the indentation 20.

The passage 10 empties into the actuator chamber, which accommodates a flow-generating device that can be used to aspirate fluid into the chamber from the area of the indentation 20 as well as from the region lying over the latter, and purge fluid out of the chamber through the passage 10 in the opposite direction when the flow-generating means are actuated accordingly.

FIG. 2 shows the state during the aspiration phase. In this phase, the flow-generating means is used to aspirate fluid streaming around the aerodynamic body 1 in the primary direction of flow S and collect it in the chamber. A slipstream symbolically denoted with arrows S1 is here generated in the area of the indentation. As a result of this slipstream, a larger amount of fluid is aspirated out of the indentation area 20a via the first edge region 23, and a smaller amount of fluid is aspirated from the aerodynamic contoured surface 3 via the second edge region 24. In other words, more fluid is aspirated from the wall 23 lying more deeply in the indentation area 20a in an aspiration phase than from the wall 24. This asymmetry in fluid quantity generates a swirl DR in the main flow streaming in the primary direction of flow. The resultant swirl DR has a rotational axis directed along the assumed aerodynamic body chord direction S-T.

In the purging phase depicted on FIG. 3, the flow-generating device generates a flow that streams from the actuator chamber into the indentation 20, and subsequently helps to create the aforementioned swirl DR, as evident from a comparison between FIGS. 2 and 3. A fluid is here purged toward the edge regions 23 and 24 in jet direction S-Out between walls 13a and 13b. The geometric asymmetry of the structural configuration of the arrangement 8 comprised of indentation 20 and passage 10 described above enhances the flow from the lateral wall 21 a to the boundary wall 11. Overall, this yields a secondary flow that can be used to supply the region of the primary flow running in proximity to the aerodynamic contoured surface 3 with energy-rich fluid exiting the passage 10. Energy-rich fluid can also be transferred from layers remote from the surface into layers of flow streaming close by the aerodynamic contoured surface 3 through induction.

The aspirating and purging phases described with reference to FIGS. 2 and 3 are cyclically repeated by correspondingly activating the flow-generating device. In one example embodiment of the invention, if a group, i.e., a sequence A1 or series A2 of several arrangements 8, is provided, each arrangement is coupled to a separate respective aspirating and purging device with a respective actuator space, so that a chronologically individual vortex or swirl DR can be generated at each arrangement 8. If a separate chamber is provided for each arrangement 8 in this example embodiment, and incorporates a respective flow-generating means, it can be provided that the aspirated and purged flows stream through these arrangements 8 in synchronous rhythm or subject to a predetermined delay relative to each other. The intended secondary flow effect can be maximized as a result. It can also be provided that the individual actuators are clocked in such a way that no gaps or vortex-free fields come about on a specific region, wherein the duration of the flow to the respectively adjacent arrangement 8 or indentation 20 is also taken into account.

As an alternative, it can be provided that several arrangements 8 are situated consecutively, and that these arrangements 8 here are either connected with a shared chamber or each individually linked with a separate chamber. If a shared chamber is provided, fluid is aspirated or purged simultaneously through all arrangements 8 by means of a flow-generating means provided in this chamber.

Given a flow toward the aerodynamic body in direction S and an aspiration of fluid through the passage 10 by means of an aspirating and purging device or an actuator, the low pressure prevailing in the region of the mouth 10a causes the formation of a flow S1, which strikes the boundary wall 11 and is downwardly diverted toward the mouth 10a and channel 13. The secondary flow S2 that comes about on the side of the aerodynamic contoured surface 3 lying opposite the indentation 20 in relation to the passage 10 does not get into the indentation, and does not stream toward the mouth 10a once the swirl DR has formed (FIG. 2). In addition, the edge region 24 can be designed as a corner that causes the secondary flow S2 to separate at the edge region 24, and if necessary to break up. The advantage to configuring the edge region with an edge line is that the latter prevents the secondary flow S2 from entering into the channel 13.

In the purging phase (FIGS. 3 and 5), the fluid exiting the passage 10 streams toward the outside as viewed from inside the aerodynamic body. The fluid in the indentation 20 is swept up in the process (entrainment), so that an asymmetrical flow state arises when alternating between the aspiration phase and purging phase (FIGS. 3 and 5).

In the aspiration phase, the fluid coming from having streamed around the aerodynamic surface is thus diverted into the indentation, and deflected by the boundary wall into the passage. The secondary flow S2 coming from the aerodynamic contoured surface on the side lying against the boundary wall can here break up above the indentation. If the edge region or corner region 24 is configured accordingly, the secondary flow S2 coming from the aerodynamic contoured surface on the side lying against the boundary wall is prevented from streaming into the indentation 21 and passage 13. The edge region or corner region 24 here acts as a detaching corner or tear-off corner for this secondary flow. Fluid exits the passage in the purging phase. This causes a slipstream or entrainment of the fluid in the indentation, and of the secondary flow S4 coming from the aerodynamic contoured surfaces on the side lying against the boundary wall 11. Over the course of several ingestion and ejection phase cycles, the flows combine to form an asymmetrical flow state, and hence a swirl DR above the indentation 21, which is stable due to the cyclic sequence.

The presence of an asymmetrical flow state can be advantageously supported by appropriately designing the edge region or corner region 24 of the mouth 10a: The edge region or corner region 24 can be configured as a tear-off edge 24 by having the latter exhibit a sharp edge, i.e., an edge line.

In another example embodiment, the aerodynamic body according to an embodiment of the invention with at least one arrangement comprised of a passage and indentation can also be used for purposes of fuel injection in a combustion engine, generating a swirl that improves the distribution of fuel in the cylinder, so that the efficiency of the combustion engine can be optimized with this measure. The arrangement 8 is here located at the site where the fuel is injected into the cylinder as viewed in the direction in which the fluid streams into the cylinder. The passage 10 is here the passage for the fuel into the combustion chamber.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An aerodynamic body with an aerodynamic surface that creates an aerodynamic contoured surface for a fluid to stream around, and with at least one flow-influencing device to influence the flow of the fluid streaming around the aerodynamic surface, wherein the flow-influencing device comprises:
   a passage running along a direction of an aerodynamic body thickness and into the aerodynamic body, the passage being configured to periodically aspirate and purge a fluid therethrough,
   an indentation disposed in the direction of the aerodynamic body thickness between the passage and the aerodynamic contoured surface, the indentation extending along a direction of an aerodynamic body wingspan, wherein the indentation is disposed in a direction of an aerodynamic body wingspan such that the passage is located at an end of the indentation in the direction of the aerodynamic body wingspan, which indentation is formed by a recessed section of the aerodynamic surface beside the passage and by a boundary wall, which boundary wall together with the recessed section defines the indentation wherein the passage is located, in the aerodynamic wingspan direction, between the boundary wall and the recessed section,
   wherein periodically aspirating and purging of the fluid through the passage generates an asymmetrical flow state providing a swirl in the flow of the fluid streaming around the aerodynamic surface, the swirl being provided over portions of the passage and the indentation, and the swirl having a rotational axis directed along a direction of an aerodynamic body chord.

2. The aerodynamic body according to claim 1, wherein an area of transition between the boundary wall and the aerodynamic contoured surface has an edge line.

3. The aerodynamic body according to claim 1, wherein a portion of the recessed section is angled with respect to the aerodynamic contoured surface as viewed in the aerodynamic body wingspan direction, such that a portion of the recessed section slopes downward toward a mouth of the passage, away from the aerodynamic contoured surface as viewed from the latter.

4. The aerodynamic body according to claim 1, wherein a plurality of arrangements comprised of a respective passage and an indentation are situated adjacent to each other and spaced apart from each other as viewed in the aerodynamic body wingspan direction, wherein combinations of the indentation and the passage are each alternately oriented oppositely relative to each other as viewed in the direction of the aerodynamic body wingspan.

5. The aerodynamic body according to claim 1, wherein the aspirating and purging device comprises a membrane actuator that at least partially borders an actuator space of the latter, and is configured in such a way that a volume of the actuator space can be increased and decreased by correspondingly activating the membrane actuator, wherein decreasing the actuator space volume purges fluid through the passage, and increasing the actuator space volume aspirates fluid through the passage.

6. A structural component for an aircraft, a land-bound vehicle or a water craft, with a structural component configured as an aerodynamic body designed according to claim 1.

7. The aerodynamic body according to claim 1, wherein the aerodynamic surface comprises a plurality of arrangements comprised of a respective passage and an indentation.

8. The aerodynamic body according to claim 7, wherein the plurality of arrangements comprised of the respective passage and the indentation are situated consecutively and spaced apart from each other as viewed in the aerodynamic body chord direction, wherein combinations of the indentation and the passage share an identical orientation as viewed in the direction of the aerodynamic body wingspan.

9. The aerodynamic body according to claim 1, wherein the aspirating and purging device comprises a flow-generating device that operatively interacts with an actuator space of the aspirating and purging device in such a way that fluid is alternately purged through the passage and aspirated through the passage periodically when the flow-generating device is correspondingly activated.

10. The aerodynamic body according to claim 9, wherein the flow-generating device comprises a rotary piston pump and/or an intermittently operating piston pump.

11. A regulating flap or main wing or fin of an aircraft designed according to claim 1.

12. The regulating flap or main wing or fin of an aircraft according to claim 11, wherein a plurality of arrangements comprised of a respective passage and an indentation are situated in a rear half of the aerodynamic surface as viewed in the direction of the aerodynamic body chord.

\* \* \* \* \*